(12) United States Patent  (10) Patent No.: US 7,804,784 B1
Lo  (45) Date of Patent: Sep. 28, 2010

(54) CABLE TESTER

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 426 days.

(21) Appl. No.: 11/893,546

(22) Filed: Aug. 16, 2007

Related U.S. Application Data

(60) Provisional application No. 60/823,710, filed on Aug. 28, 2006.

(51) Int. Cl.
*H04L 12/26* (2006.01)
(52) U.S. Cl. ...................................... 370/251
(58) Field of Classification Search .................. 370/251
See application file for complete search history.

(56) References Cited

U.S. PATENT DOCUMENTS

| | | | |
|---|---|---|---|
| 4,914,394 A | 4/1990 | Meyer |
| 5,420,512 A | 5/1995 | Spillane et al. |
| 5,461,318 A | 10/1995 | Borchert et al. |
| 5,559,427 A | 9/1996 | Hinds et al. |
| 5,629,628 A | 5/1997 | Hinds et al. |
| 6,138,080 A | 10/2000 | Richardson |
| 6,177,801 B1 | 1/2001 | Chong |
| 6,198,727 B1 | 3/2001 | Wakeley et al. |
| 6,341,358 B1 | 1/2002 | Bagg et al. |
| 6,377,640 B2 | 4/2002 | Trans |
| 6,417,672 B1 | 7/2002 | Chong |
| 6,434,716 B1 | 8/2002 | Johnson et al. |
| 6,438,163 B1 | 8/2002 | Raghavan et al. |
| 6,448,899 B1 | 9/2002 | Thompson |
| 6,522,152 B1 | 2/2003 | Tonti et al. |
| 6,535,983 B1 | 3/2003 | McCormack et al. |
| 6,633,166 B1 | 10/2003 | Kaiser |
| 6,694,017 B1 | 2/2004 | Takada |
| 6,728,216 B1 | 4/2004 | Sterner |
| 6,775,529 B1 | 8/2004 | Roo |

(Continued)

FOREIGN PATENT DOCUMENTS

WO    WO 01/11861    2/2001

(Continued)

OTHER PUBLICATIONS

IEEE Std 802.3-2002 (Revision of IEEE Std 802.3®, 2000 Edition) IEEE Standard for Information technology—Telecommunications and information exchange between systems— Local and metropolitan area networks—Specific requirements—Part 3: Carrier sense multiple access with collision detection (CSMA/CD) access method and physical layer specifications; LAN/MAN Standards Committee of the IEEE Computer Society; Mar. 8, 2002; 578 pages.

(Continued)

*Primary Examiner*—Anh-Vu Ly

(57) ABSTRACT

A network interface includes a physical layer (PHY) device and a medium access controller (MAC). The PHY device includes a cable-test module and a data processing module. The cable-test module selectively tests a cable connected to the PHY device and generates test data. The data processing module includes a first processor that processes the test data and that generates test results indicating a status of the cable. The MAC communicates with the PHY device and includes a second processor, wherein the PHY device selectively communicates the status to the second processor.

29 Claims, 11 Drawing Sheets

U.S. PATENT DOCUMENTS

| | | | |
|---|---|---|---|
| 6,777,952 B2 | 8/2004 | Seymour | |
| 6,825,672 B1 | 11/2004 | Lo et al. | |
| 6,829,223 B1 | 12/2004 | Richardson et al. | |
| 6,873,827 B1 | 3/2005 | Wright | |
| 6,883,025 B2 | 4/2005 | Andra et al. | |
| 6,891,803 B1 | 5/2005 | Chang et al. | |
| 6,898,185 B1 | 5/2005 | Agazzi et al. | |
| 6,922,060 B1 | 7/2005 | Wendel et al. | |
| 6,940,289 B2 | 9/2005 | Hyacinthe et al. | |
| 6,977,507 B1 | 12/2005 | Pannell et al. | |
| 6,980,007 B1* | 12/2005 | Lo et al. | 324/543 |
| 6,982,557 B1* | 1/2006 | Lo et al. | 324/539 |
| 6,992,491 B1* | 1/2006 | Lo et al. | 324/533 |
| 6,995,551 B1* | 2/2006 | Lo et al. | 324/73.1 |
| 7,002,353 B1* | 2/2006 | Lo et al. | 324/534 |
| 7,005,861 B1* | 2/2006 | Lo et al. | 324/533 |
| 7,019,533 B1* | 3/2006 | Lo et al. | 324/543 |
| 7,026,825 B1* | 4/2006 | Lo et al. | 324/543 |
| 7,058,559 B1* | 6/2006 | Roeck et al. | 375/222 |
| 7,068,043 B1* | 6/2006 | Lo et al. | 324/533 |
| 7,068,044 B1* | 6/2006 | Lo et al. | 324/534 |
| 7,075,283 B1* | 7/2006 | Lo et al. | 324/73.1 |
| 7,127,481 B1 | 10/2006 | Lam | |
| 7,161,911 B1 | 1/2007 | Fang et al. | |
| 7,173,431 B1* | 2/2007 | Lo et al. | 324/543 |
| 7,190,172 B1 | 3/2007 | Lo et al. | |
| 7,203,851 B1 | 4/2007 | Lo et al. | |
| 7,227,889 B1* | 6/2007 | Roeck et al. | 375/222 |
| 7,246,368 B1* | 7/2007 | Millet et al. | 725/111 |
| 7,250,771 B1* | 7/2007 | Lo et al. | 324/533 |
| 7,276,913 B1* | 10/2007 | Lo et al. | 324/533 |
| 7,358,745 B1* | 4/2008 | Lo et al. | 324/533 |
| 7,375,532 B1* | 5/2008 | Lo et al. | 324/534 |
| 7,403,018 B1* | 7/2008 | Lo et al. | 324/533 |
| 7,576,548 B1* | 8/2009 | Lo et al. | 324/543 |
| 7,624,197 B1 | 11/2009 | Lo | |
| 2002/0124110 A1 | 9/2002 | Tanaka | |
| 2003/0204611 A1* | 10/2003 | McCosh et al. | 709/230 |
| 2007/0022331 A1 | 1/2007 | Jamieson et al. | |
| 2007/0230555 A1* | 10/2007 | Peleg et al. | 375/232 |

FOREIGN PATENT DOCUMENTS

| | | |
|---|---|---|
| WO | WO 01/11861 A2 | 2/2001 |
| WO | WO 01/11861 A3 | 2/2001 |

OTHER PUBLICATIONS

IEEE Std 802.3-2002 (Revision of IEEE Std 802.3 ®, 2000 Edition) IEEE Standard for Information technology—Telecommunications and information exchange between systems—Local and metropolitan area networks—Specific requirements—Part 3: Carrier sense multiple access with Collision Detection (CSMA/CD) access method and physical layer specifications; Section Two: This section includes Clauses 21 through 22 and Annexes 22A through 32A; LAN/MAN Standards Committee of the IEEE Computer Society; Mar. 8, 2002; 582 pages.

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; Section Three: This section includes Clauses 34 through 43 and Annexes 36A through 43C; LAN/MAN Standards Committee of the IEEE Computer Society; Mar. 8, 2002; 379 pages.

U.S. Appl. No. 60/217,418, filed Jul. 11, 2000, Lam, Yat-Tung.

Gundersen, M. et al., Bipolar Nanosecond Pulse Generation Using Transmission Lines for Cell Electro-Manipulation, Conference Record of International Power Modulator Symposium, 2004, May 23-26, 2004, p. 224-227.

IEEE Computer Society; IEEE Standard 802.3ab; IEEE Std 802.3-2002, IEEE Standard for Information technology - Telecommunications and information exchange between systems - Local and metropolitan area networks - Specific requirements; Part 3: Carrier sense multiple access with collision detection (CSMA/CD) access method and physical layer specifications, Mar. 8, 2002, pp. 174-249 and pp. 147-173.

IEEE Std 802.Mar. 2002 (Revision of IEEE Std 802.3®, 2000 Edition) IEEE Standard for Information technology - Telecommunications and information exchange between systems - Local and metropolitan area networks - Specific requirements - Part 3: Carrier sense multiple access with collision detection (CSMA/CD) access method and physical layer specifications; LAN/MAN Standards Committee of the IEEE Computer Society; Mar. 8, 2002; 578 pages.

IEEE Std 802.Mar. 2002 (Revision of IEEE Std 802.3®, 2000 Edition) IEEE Standard for Information technology - Telecommunications and information exchange between systems - Local and metropolitan area networks - Specific requirements - Part 3: Carrier sense multiple access with Collision Detection (CSMA/CD) access method and physical layer specifications; Section Two: This section includes Clauses 21 through 22 and Annexes 22A through 32A; LAN/MAN Standards Committee of the IEEE Computer Society; Mar. 8, 2002; 582 pages.

* cited by examiner

CABLE TESTER

CROSS-REFERENCE TO RELATED APPLICATIONS

This application claims the benefit of U.S. Provisional Application No. 60/823,710, filed on Aug. 28, 2006. The disclosure of the above application is incorporated herein by reference in its entirety.

FIELD

The present disclosure relates to cable diagnostic systems, and more particularly to diagnostic systems for testing network cables.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

One goal of a network manager is to control total cost of ownership of the network. Cabling problems can cause a significant amount of network downtime and can require troubleshooting resources, which may increase the total cost of ownership. Providing tools that efficiently solve cabling problems may increase network uptime and reduce the total cost of ownership.

In wireline networks, such as Ethernet-based networks, network devices may be interconnected using multi-conductor cables. A network device generally comprises a physical layer module (PHY) and a medium access controller (MAC). The PHY may connect the network device to a cable. The MAC provides an interface between the PHY and a host.

Referring now to FIG. 1, a MAC 2 and a PHY 4 in a network device 10 communicate via a two-wire management data input/output (MDIO) interface. The MDIO interface is a synchronous serial interface that the MAC 2 uses to access internal registers Reg. 1, Reg. 2, . . . , Reg. N of the PHY 4. Specifically, the MAC 2 reads and writes data into the internal registers of the PHY 4 via the MDIO interface. The MDIO interface is defined by I.E.E.E. section 802.3 and is incorporated herein by reference in its entirety.

The MDIO interface comprises a management data clock and a MDIO bi-directional multi-drop data line. A MDIO control module 6 provides the management data clock to synchronize data transfers on the data line. The data line is a shared tri-stateable bus. A MDIO interface module 8 in the PHY 4 interfaces the internal registers of the PHY 4 to the MDIO control module 6. The MAC 2 drives the data line during write operations, and the PHY 4 drives the data line during read operations. A processor 14 in the MAC 2 controls the read/write operations, processes data, and communicates with a host (not shown).

Referring now to FIGS. 2-3, a first network device 20 may be connected to a second network device 22, called a link partner, using a cable 16. The first network device 20 comprises a PHY 24 and a MAC 26. The PHY 24 may be coupled to the cable 16 via a connector 12. The second network device 22 comprises a PHY 28 and a MAC 29. The PHY 28 may be coupled to the cable 16 via a connector 15. The cable 16 may be a CAT 5 or a CAT 6 twisted-pair cable having four pairs of twisted wire as shown in FIG. 3 (twist not shown) or other suitable cable. Connectors 12 and 15 may be RJ45 connectors or other suitable connectors.

Referring now to FIG. 4, a conventional cable tester 30 may be frequently used to isolate cabling problems. The cable tester 30 is coupled by the connector 12 (such as a RJ-45 or other connector) to the cable 16. The connector 15 connects the cable to a load 36. The load 36 is typically a loopback module. The cable tester 30 detects a short or an open condition in a crossed or a reversed pair in the cable 16. The short or open condition may be detected without the load 36. Additionally, the cable tester 30 can determine a length of the cable 16 and a distance from one end of the cable 16 to a point where the cable 16 may have a fault such as a short or an open condition.

In a multi-conductor cable, a short condition may occur when two or more conductors in the cable 16 are short-circuited together. An open condition may occur when one or more conductors in the cable 16 lack continuity between both ends of the cable 16. A crossed pair may occur when a pair of conductors communicates with different pins at each end of the cable 16. For example, a first pair may communicate with pins 1 and 2 at one end and with pins 3 and 6 at the other end. A reversed pair may occur when two ends in a pair are connected to opposite pins at each end of the cable 16. For example, a conductor connected to pin 1 on one end may communicate with pin 2 at the other end, and a conductor connected to pin 2 on one end may communicate with pin 1 at the other end.

The cable tester 30 may employ time domain reflectometry (TDR), which is based on transmission line theory, to troubleshoot faults in the cable 16. The cable tester 30 may transmit a pulse 37 on the cable 16 and analyze a reflection or a return pulse 38 when received. Specifically, the cable tester 30 may measure a difference between a time when the pulse 37 is transmitted and a time when the return pulse 38 is received. Additionally, the cable tester 30 may analyze characteristics such as shape and size of the return pulse 38 relative to the pulse 37 that is transmitted. Based on the characteristics of the pulses and electrical properties of the cable 16 such as specific resistance, propagation constant, etc., the cable tester 30 identifies faults in the cable 16. Additionally, the cable tester 30 estimates the length of the cable 16 and a distance from a test point to a point of a fault in the cable 16.

Conventional cable testers 30, however, may generate inaccurate results when the cable 16 is terminated by an active link partner generating link signals during a test. For example, TDR cannot determine the length of the cable 16 (hereinafter cable length) when the link is active, that is, when the link partner at the remote end of the cable 16 is active or in use. This is because the remote end of the cable 16 is properly terminated when the link partner is active. In that case, the cable 16 functions as a substantially balanced transmission line. That is, when the remote end receives a TDR pulse, the remote end may return a very weak signal. Weak return signals cannot be analyzed unless extensive electronic circuits are used. Implementing extensive electronic circuits, however, can be expensive and may not be feasible in low-cost systems.

On the other hand, digital signal processing (DSP) can determine cable length when the link is active. In DSP, unlike in TDR, no pulses are injected into the cable 16. Instead, parameters such as amplitude, pulse width, pulse shape, etc., of signals that are normally transmitted and received on the cable 16 are measured to determine the length of the cable 16.

DSP, however, involves making some assumptions and therefore yields cable length measurements that are approximate rather than accurate.

For example, if the cable length is determined based on amplitude of a received signal, the amplitude of the transmitted signal is generally unknown or unknowable and therefore needs to be assumed. Additionally, any attenuation in the received signal is calculated by assuming an average attenuation per unit length of the cable 16. Therefore, cable length determined using DSP is generally an approximate estimate rather than an accurate measurement.

Thus, in low-cost cable testers, since TDR cannot analyze reflections from a terminated or an active remote end, TDR cannot determine cable length although the cable 16 is good, i.e., although the cable 16 has no fault. On the other hand, although DSP can determine the length of the cable 16 that is properly terminated or connected to an active remote end, DSP fails to determine the length if the cable 16 is too long for local and remote ends to communicate.

SUMMARY

A network interface comprises a physical layer (PHY) device and a medium access controller (MAC). The physical layer (PHY) device includes a cable-test module and a data processing module. The cable-test module selectively tests a cable connected to the PHY device and generates test data. The data processing module includes a first processor that processes the test data and that generates test results indicating a status of the cable. The MAC communicates with the PHY and includes a second processor, wherein the PHY device selectively communicates the status to the second processor.

In another feature, the network interface further comprises a management data input/output (MDIO) interface wherein the PHY device and the second processor communicate via the MDIO interface.

In another feature, the cable-test module tests the cable upon one of powering up and receiving a control signal from the second processor.

In another feature, the PHY communicates the status to the second processor upon one of powering up and receiving a control signal from the second processor.

In another feature, the cable-test module further comprises first and second echo measuring modules that communicate with first and second pairs of the cable, that have finite impulse response (FIR) filters with first taps, and that measure echo on the first and second pairs, respectively. The cable-test module further comprises first and second crosstalk measuring modules that communicate with the first and second pairs, that have FIR filters with second taps, and that measure crosstalk on the first and second pairs, respectively. The data processing module determines at least one of a type of the cable, a distance to at least one of the echo and the crosstalk, and an impedance of the cable at the distance based on at least one of the first and second taps.

In another feature, the PHY device transmits a test signal on the cable and determines an impedance of the cable by comparing an amplitude of a return signal with an amplitude-impedance relationship stored in a lookup table in the PHY device.

In another feature, the cable-test module comprises a time domain reflectometry (TDR) module that transmits test signals on the cable, that receives return signals, and that generates the test data based on the test signals and the return signals.

In another feature, the PHY transmits and receives signals comprises network data on the cable, and wherein the cable-test module comprises a digital signal processing (DSP) module that processes the signals and that generates the test data.

In another feature, the MAC receives a cable-test program that the first processor executes to test the cable from a remote device and the MAC communicates the cable-test program to the data processing module. The data processing module stores the cable-test program, and the first processor executes the cable-test program to test the cable.

In another feature, the status of the cable includes at least one of a length of the cable, an open circuit in the cable, a distance from the PHY device to the open circuit, a short-circuit in the cable, a distance from the PHY device to the short-circuit in the cable, an impedance at a predetermined length of the cable, and a type of the cable.

In still other features, a method comprises integrating a cable-test module and a first processor in a physical layer (PHY) device, selectively testing a cable connected to the PHY device, and generating test data using the cable-test module. The method further comprises processing the test data using the first processor, generating test results indicating a status of the cable, and selectively communicating the status to a second processor of a medium access controller (MAC).

In another feature, the method further comprises testing the cable upon one of powering up and receiving a control signal from the second processor.

In another feature, the method further comprises communicating the status to the second processor upon one of powering up and receiving a control signal from the second processor.

In another feature, the method further comprises communicating with first and second pairs of the cable via first and second echo measuring modules, respectively, reading first taps of finite impulse response (FIR) filters of the first and second echo measuring modules, and measuring echo on the first and second pairs. The method further comprises communicating with the first and second pairs of the cable via first and second crosstalk measuring modules, respectively, reading second taps of FIR filters of the first and second crosstalk measuring modules, and measuring crosstalk on the first and second pairs. The method further comprises determining at least one of a type of the cable, a distance to at least one of the echo and the crosstalk, and an impedance of the cable at the distance based on at least one of the first and second taps.

In another feature, the method further comprises transmitting a test signal on the cable, measuring an amplitude of a return signal, and determining an impedance of the cable based on the amplitude and the amplitude-impedance relationship stored in the lookup table.

In another feature, the method further comprises transmitting test signals on the cable, receiving return signals, and generating the test data based on the test signals and the return signals using time domain reflectometry (TDR).

In another feature, the method further comprises using digital signal processing (DSP) for processing signals comprises network data that the PHY transmits and receives on the cable and generating the test data.

In another feature, the method further comprises receiving a cable-test program that the first processor executes to test the cable from a remote device into the MAC, and communicating the cable-test program from the MAC to the PHY device, storing the cable-test program in the PHY device, and executing the cable-test program to test the cable.

In another feature, the method further comprises indicating the status of the cable that includes at least one of a length of the cable, an open circuit in the cable, a distance from the PHY device to the open circuit, a short-circuit in the cable, distance from the PHY device to the short-circuit in the cable, a type of the cable, and an impedance at a predetermined length of the cable.

In still other features, a network interface comprises physical layer (PHY) means for communicating with a cable, wherein the PHY means includes cable-test means for selectively testing the cable and generating test data and data processing means for processing the test data. The data processing means includes first processing means for processing the test data and generating test results indicating a status of the cable. The network interface further comprises medium access controller (MAC) means for communicating with the PHY means, wherein the MAC means includes second processing means for selectively receiving the status from the PHY means.

In another feature, the network interface further comprises management data input/output (MDIO) interface means for interfacing the PHY means to the second processing means.

In another feature, the cable-test means tests the cable upon one of powering up and receiving a control signal from the second processing means.

In another feature, the PHY means tests communicates the status to the second processing means upon one of powering up and receiving a control signal from the second processing means.

In another feature, the cable-test means further comprises first and second echo measuring means that have finite impulse response (FIR) filters with first taps for measuring echo on first and second pairs of the cable, respectively. The cable-test means further comprises first and second crosstalk measuring means that have FIR filters with second taps for measuring crosstalk on the first and second pairs, respectively. The data processing means determines at least one of a type of the cable, a distance to at least one of the echo and the crosstalk, and an impedance of the cable at the distance based on at least one of first and second taps.

In another feature, the PHY means transmits a test signal on the cable and determines an impedance of the cable by comparing an amplitude of a return signal with an amplitude-impedance relationship stored in a lookup table in the PHY means.

In another feature, the cable-test means comprises time domain reflectometry (TDR) means for transmitting test signals on the cable, receiving return signals, and generating the test data based on the test signals and the return signals.

In another feature, the PHY means transmits and receives signals comprises network data on the cable, and wherein the cable-test means comprises a digital signal processing (DSP) means for processing the signals and generating the test data.

In another feature, the MAC means receives a cable-test program that the first processor executes to test the cable from a remote device and the MAC means communicates the cable-test program to the data processing means. The data processing means stores the cable-test program, and the first processing means executes the cable-test program to test the cable.

In another feature, the status of the cable includes at least one of a length of the cable, an open circuit in the cable, a distance from the PHY device to the open circuit, a short-circuit in the cable, a distance from the PHY device to the short-circuit in the cable, a type of the cable, and an impedance at a predetermined length of the cable.

In still other features, a computer program executed by a processor comprises integrating a cable-test module and a first processor in a physical layer (PHY) device, selectively testing a cable connected to the PHY device, and generating test data using the cable-test module. The computer program further comprises processing the test data using the first processor, generating test results indicating a status of the cable, and selectively communicating the status to a second processor of a medium access controller (MAC).

In another feature, the computer program further comprises testing the cable upon one of powering up and receiving a control signal from the second processor.

In another feature, the computer program further comprises communicating the status to the second processor upon one of powering up and receiving a control signal from the second processor.

In another feature, the computer program further comprises communicating with first and second pairs of the cable via first and second echo measuring modules, respectively, reading first taps of finite impulse response (FIR) filters of the first and second echo measuring modules, and measuring echo on the first and second pairs. The computer program further comprises communicating with the first and second pairs of the cable via first and second crosstalk measuring modules, respectively, reading second taps of FIR filters of the first and second crosstalk measuring modules, and measuring crosstalk on the first and second pairs. The computer program further comprises determining at least one of a type of the cable, a distance to at least one of the echo and the crosstalk, and an impedance of the cable at the distance based on at least one of the first and second taps.

In another feature, the computer program further comprises transmitting a test signal on the cable, measuring an amplitude of a return signal, and determining an impedance of the cable based on the amplitude and the amplitude-impedance relationship stored in the lookup table.

In another feature, the computer program further comprises transmitting test signals on the cable, receiving return signals, and generating the test data based on the test signals and the return signals using time domain reflectometry (TDR).

In another feature, the computer program further comprises using digital signal processing (DSP) for processing signals comprises network data that the PHY transmits and receives on the cable and generating the test data.

In another feature, the computer program further comprises receiving a cable-test program that the first processor executes to test the cable from a remote device into the MAC, communicating the cable-test program from the MAC to the PHY device, storing the cable-test program in the PHY device, an executing the cable-test program to test the cable.

In another feature, the computer program further comprises indicating the status of the cable that includes at least one of a length of the cable, an open circuit in the cable, a distance from the PHY device to the open circuit, a short-circuit in the cable, a distance from the PHY device to the short-circuit in the cable, a type of the cable, and an impedance at a predetermined length of the cable.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodi-

BRIEF DESCRIPTION OF THE DRAWINGS

The present disclosure will become more fully understood from the detailed description and the accompanying drawings, wherein.

DETAILED DESCRIPTION

Figure 1:
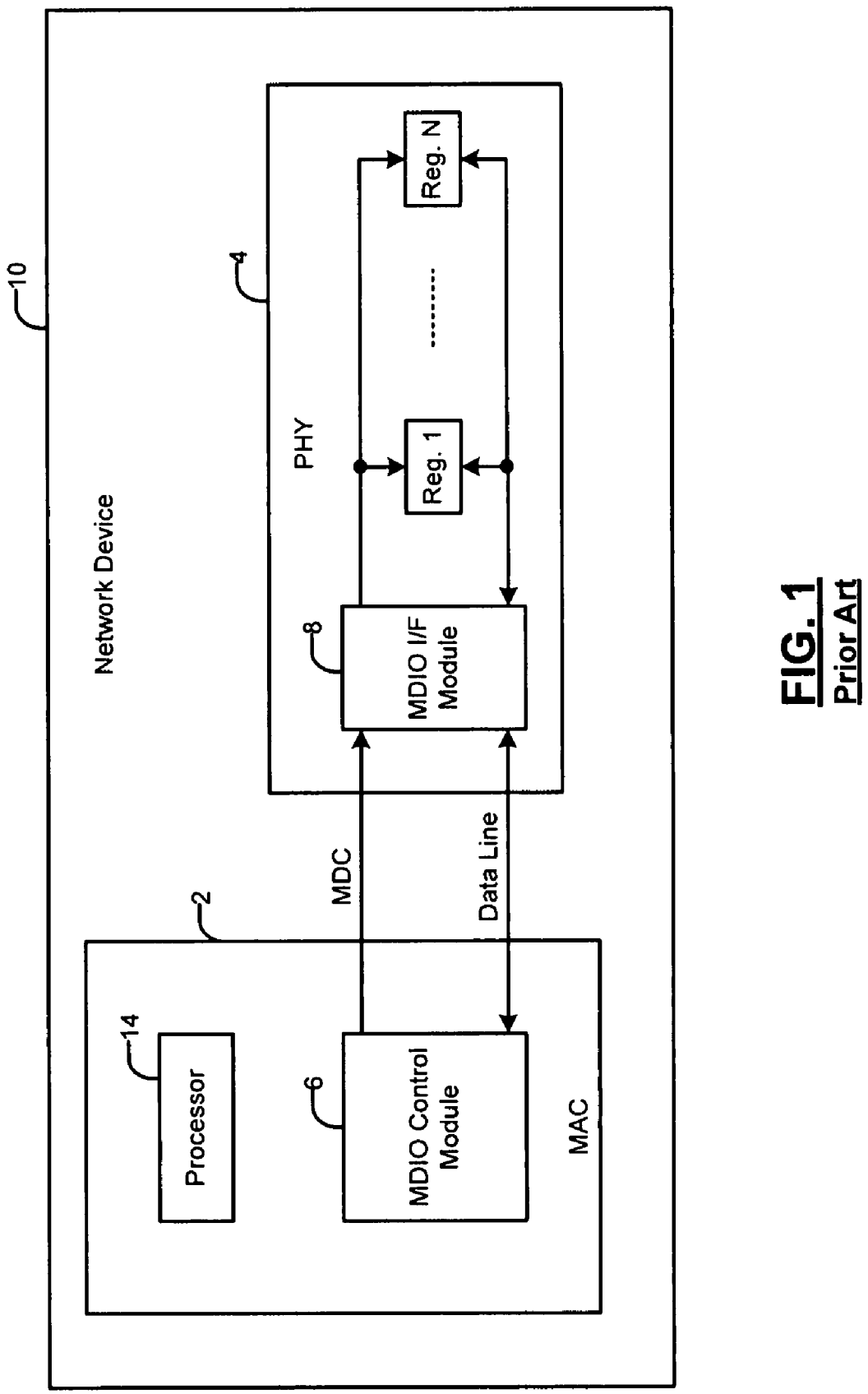
FIG. 1 is a functional block diagram of a network device according to the prior art.
Figure 2:
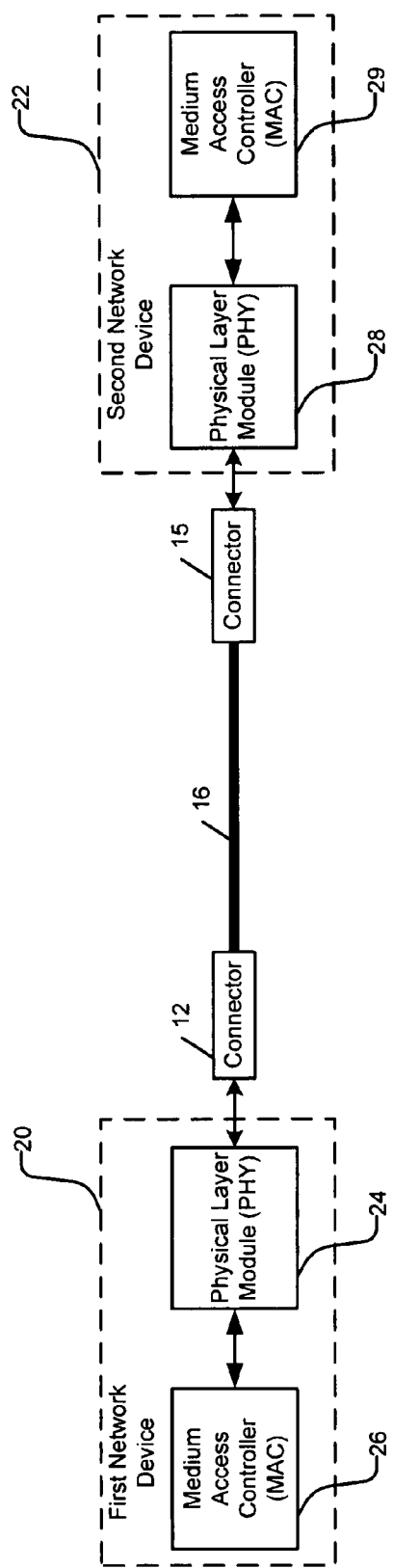
FIG. 2 is a functional block diagram of an exemplary network comprising a first network device communicating with a second network device via a twisted-pair cable.
Figure 3:
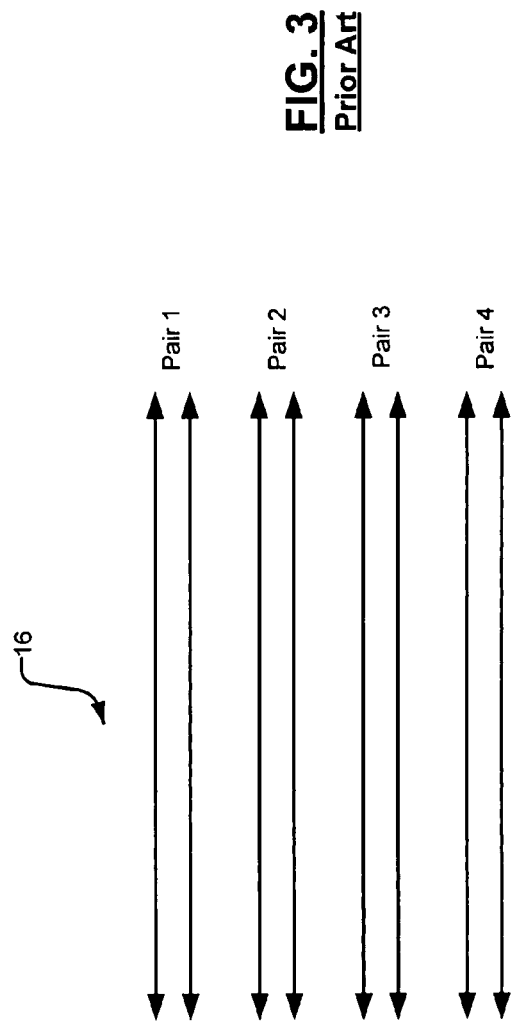
FIG. 3 shows components of the twisted-pair cable of FIG. 2.
Figure 4:
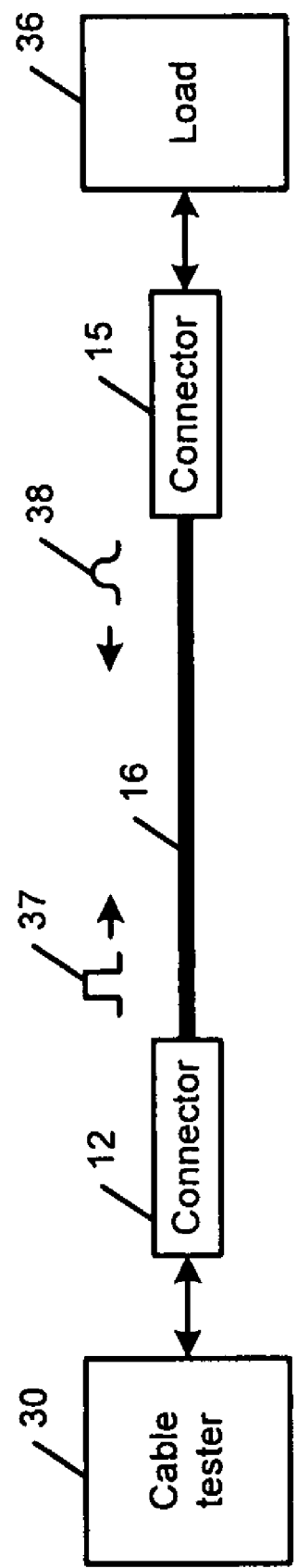
FIG. 4 is a functional block diagram of a cable tester according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 5:
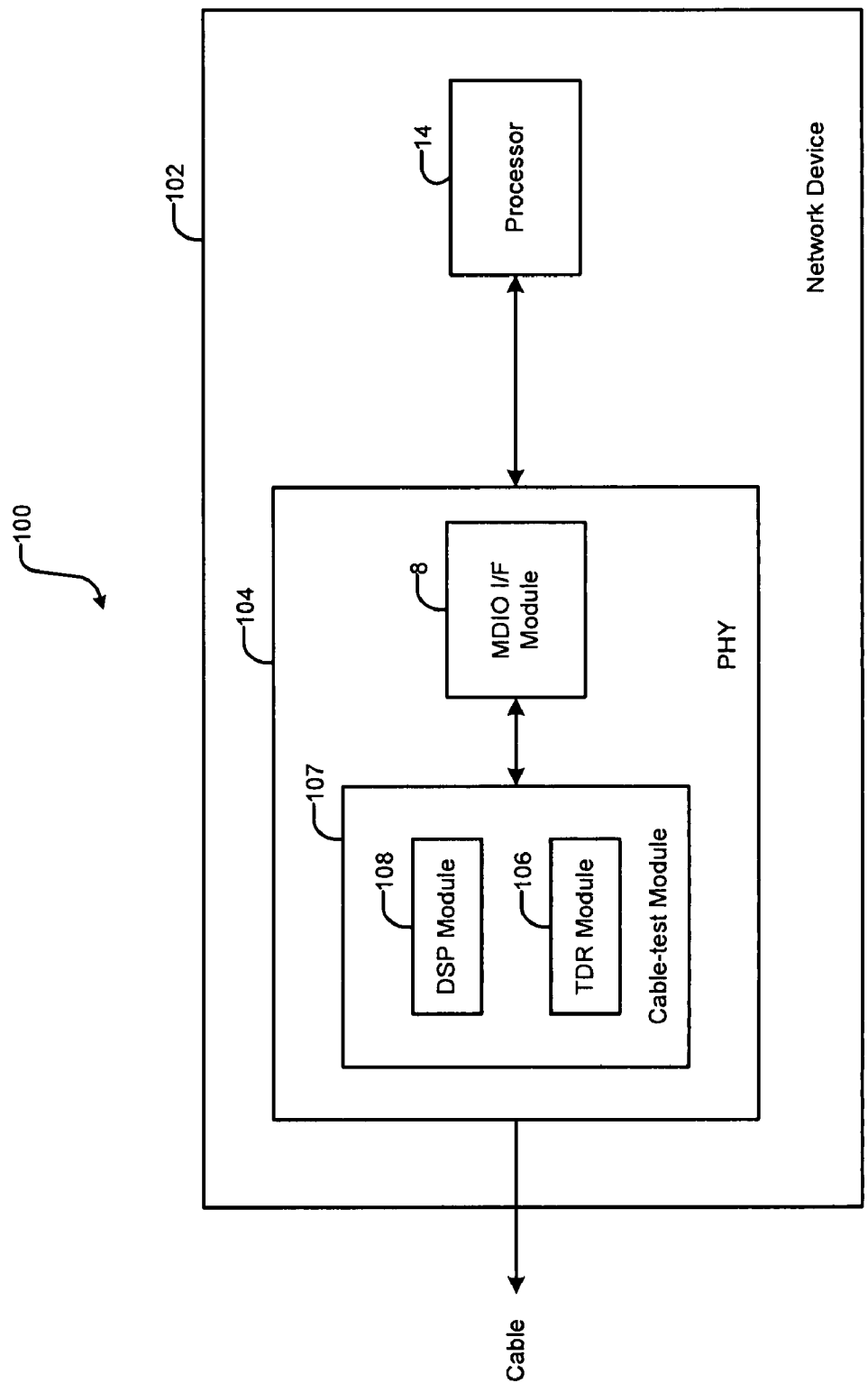
FIG. 5 is a functional block diagram of an exemplary cable tester built into a network device.

Cable testers may be built into physical layer modules (PHYs) of network devices. Built-in cable testers may perform cable tests randomly or based on events such as power on self-test, user-initiated diagnostics, etc. Referring now to FIG. 5, a system 100 for testing a cable (not shown) connected to a network device 102 comprises a PHY 104 and a processor 14. One end of the cable is connected to the PHY 104. Another end of the cable may be connected to a remote PHY (not shown). The cable may have several pairs of conductors. One or more pairs of the cable may be used for communicating between the PHY 104 and the remote PHY.

The PHY 104 comprises a cable-test module 107 and a management data input/output (MDIO) module 8. The cable-test module 107 comprises a time domain reflectometry (TDR) module 106 and/or a digital signal processing (DSP) module 108. The MDIO interface module 8 interfaces the cable-test module 107 to the processor 14. The PHY 104 may use TDR and/or DSP to diagnose the cable when cable test is initiated.

For example, the PHY 104 may test the cable and measure a length of the cable by performing TDR pair-by-pair on all pairs of the cable. Specifically, the TDR module 106 may transmit multiple pulses over each pair of the cable. For each transmitted pulse, the TDR module 106 may receive a reflection or a return pulse from the remote end of the cable or from a point of fault along the length of the cable. The TDR module 106 generates TDR data based on reflections or return pulses received and stores the TDR data in internal registers of the PHY 104. The processor 14 retrieves the TDR data from the internal registers serially via the MDIO interface module 8.

Alternatively or additionally, the DSP module 108 may generate DSP data based on signals that are transmitted and received via the cable during normal operation of the network device 102. The DSP data is stored in the internal registers of the PHY 104, and the processor 14 may retrieve the DSP data from the internal registers serially via the MDIO interface module 8.

The processor 14 analyzes the TDR/DSP data and determines cable status. For example, the processor 14 may determine whether the cable has a fault such as an open or a short circuit. Additionally, the processor 14 may determine a distance from the PHY 104 to the remote end of the cable, which is the length of the cable, or the distance from the PHY 104 to a point of fault along the length of the cable.

When analyzing the TDR/DSP data, the processor 14 may perform various complex calculations. For example, the processor 14 may calculate and compare amplitudes and travel times of the pulses, compare changes in shapes of the pulses, etc. The processor 14 provides results of the cable status in a format that is compatible with an application running on a host with which the processor 14 communicates.

TDR/DSP data, however, may be voluminous and may take a long time to transfer via the serial MDIO interface from the PHY 104 to the processor 14. Thus, retrieving and processing the TDR/DSP data may load the MDIO interface and the processor 14, which may impact other tasks the processor 14 may perform during normal operation of the network device 102. A data processing module comprising a processor that is dedicated to process and analyze the TDR/DSP data may be embedded in a PHY.

Figure 6:
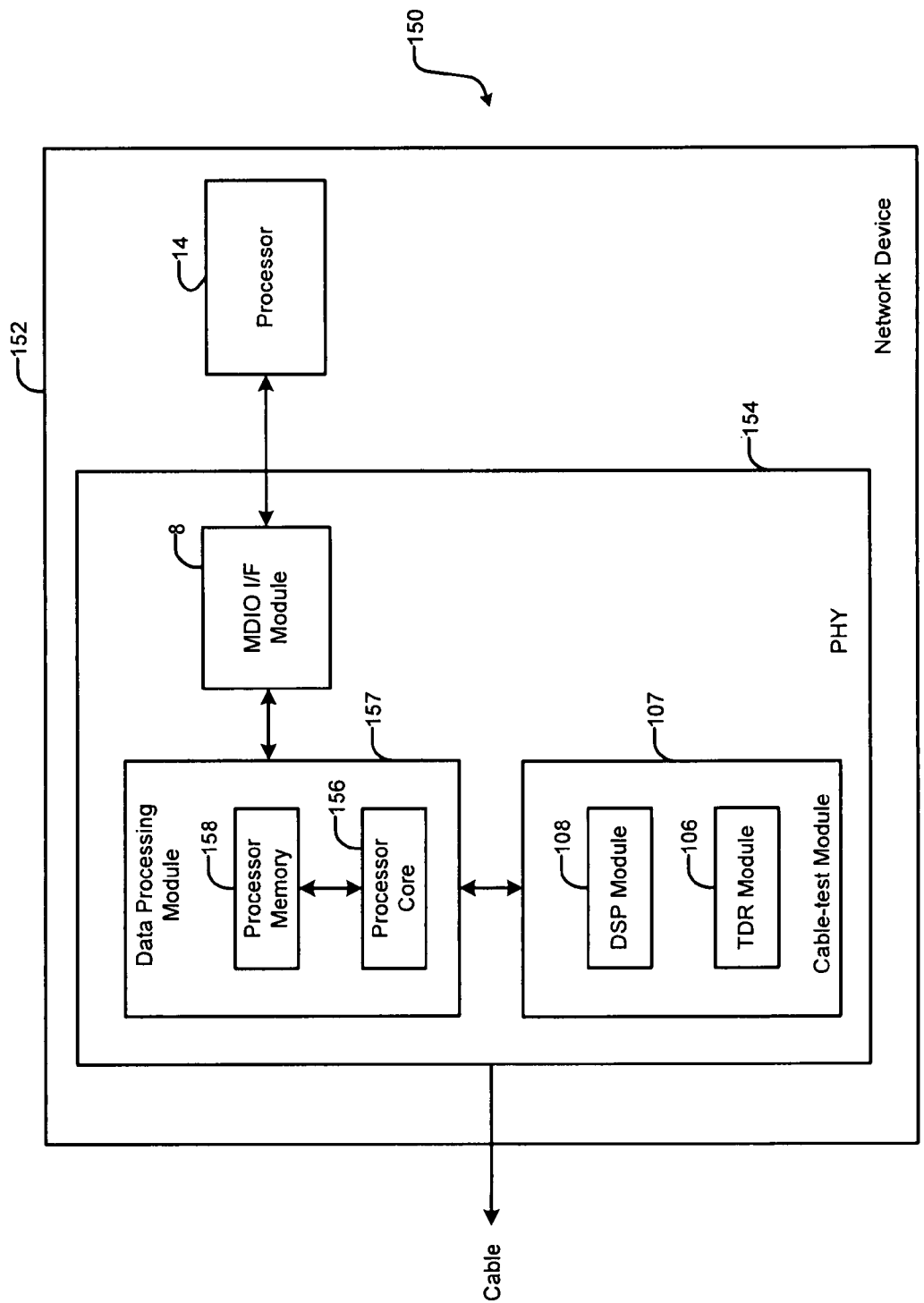
FIG. 6 is a functional block diagram of an exemplary cable tester built into a physical layer module (PHY) of a network device according to the present disclosure.

Referring now to FIG. 6, a system 150 for testing a cable (not shown) connected to a network device 152 comprises a PHY 154 and a processor 14. One end of the cable is connected to the PHY 154. Another end of the cable may be connected to a remote PHY (not shown). The cable may have several pairs of conductors. One or more pairs of the cable may be used for communicating between the PHY 154 and the remote PHY.

The PHY 154 comprises a cable-test module 107, a data processing module 157, and a management data input/output (MDIO) module 8. The cable-test module 107 comprises a time domain reflectometry (TDR) module 106 and a digital signal processing (DSP) module 108. The PHY 154 may use TDR and/or DSP to diagnose the cable when a cable test is initiated. The data processing module 157 comprises a processor core 156 and a processor memory 158. The data processing module 157 processes data generated by the cable-test module 107 during the cable test.

The processor 14 communicates with the data processing module 157 via the MDIO interface module 8. The processor 14 may initiate the cable test on power up. Alternatively, a user of the network device 150 may initiate the cable test via an application running on the host. In that case, the processor 14 may initiate the cable test at the request of the user.

When testing the cable, the TDR module 106 and/or the DSP module 108 may generate data related to pulses/signals that communicate through the cable. The TDR module 106 and/or the DSP module 108 communicate with the processor core 156. The processor core 156 may be designed specifically to process and analyze the data generated by the TDR module 106 and the DSP module 108.

The processor memory 158 communicates with the processor core 156 and provides code (i.e., a set of executable instructions) to the processor core 156. The processor core 156 executes the code when performing cable tests. The processor core 156 processes and analyzes the data generated by and received directly from the TDR module 106 and the DSP module 108. The processor core 156 performs various calculations and generates results that indicate cable status. The processor core 156 stores the results in the processor memory 158. The results may be in a format that is compatible with the application running on the host with which the processor 14 communicates.

The processor 14 interfaces with the processor memory 158 via the MDIO interface module 8. The processor 14 accesses the processor memory 158, retrieves the results stored in the processor memory 158, and forwards the results to the application running on the host. Thus, the processor 14 does not process and analyze the data related to cable testing. Instead, the processor 14 may perform other tasks related to the operation of the network device 152. Additionally, since data generated by the TDR module 106 and the DSP module does not flow through the MDIO interface module 8, cable testing does not affect the throughput of the MDIO interface.

The processor memory 158 may comprise random access memory (RAM) and read-only memory (ROM). The code may be preprogrammed in ROM. Alternatively, the processor 14 may download the code from the application running on the host and load the code in the RAM. In either case, if the design of at least one of the processor core 156, the TDR module 106, and the DSP module 108 is changed, the code can be easily changed to correspond to changes in the design. Additionally, the format of the results generated by the data processing module 157 remains unchanged despite the changes in the design and the code.

The PHY 154 may be implemented by a single integrated circuit. That is, a single integrated circuit may comprise the cable-test module 107, the data processing module 157, and the MDIO interface module 8. Alternatively, the PHY 154 and a MAC comprising the processor 14 may be implemented by a single integrated circuit. Additionally, a system-on-chip (SOC) that implements the network device 152 may comprise the PHY 154 and the MAC comprising the processor 14.

Figure 7:
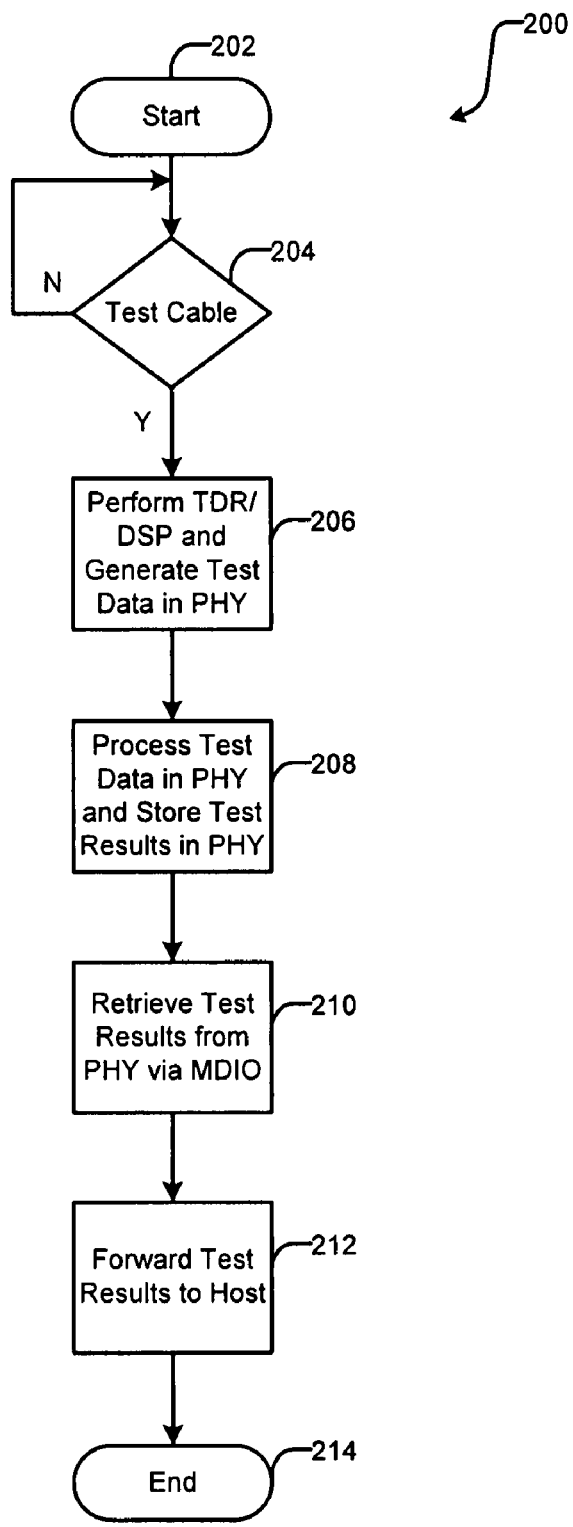
FIG. 7 is a flowchart of a method for testing cables using a cable tester built into a PHY of a network device according to the present disclosure.

Referring now to FIG. 7, a method 200 for testing cables by processing and analyzing the TDR/DSP data in the PHY 154 begins at step 202. The processor core 156 in the PHY 154 determines in step 204 whether a cable test is initiated. If false, step 204 is repeated. If true, in step 206, the TDR module 106 and/or the DSP module 108 generate test data related to pulses/signals that communicate through the cable.

In step 208, the processor core 156 processes the test data received directly from the TDR module 106 and the DSP module 108 and stores results generated indicating cable status in the processor memory 158 in the PHY 154. In step 210, the processor 14 communicates with the processor memory 158 via a MDIO interface module 8 and retrieves the results from the processor memory 158. In step 212, the processor 14, which communicates with a host, forwards the results to an application running on the host. The method 200 ends in step 214.

In addition to determining whether the cable is faulty, the PHY 154 can determine many other characteristics of the cable including the type of the cable (i.e., twisted pair, 4-pair, etc.) and the impedance of the cable at different points of the cable. For example, the PHY 154 can determine the type of the cable by measuring echo and cross-talk on the pairs of a cable, and the impedance of the cable at different points of the cable by measuring the distances to the echo and/or crosstalk.

Figure 8A:
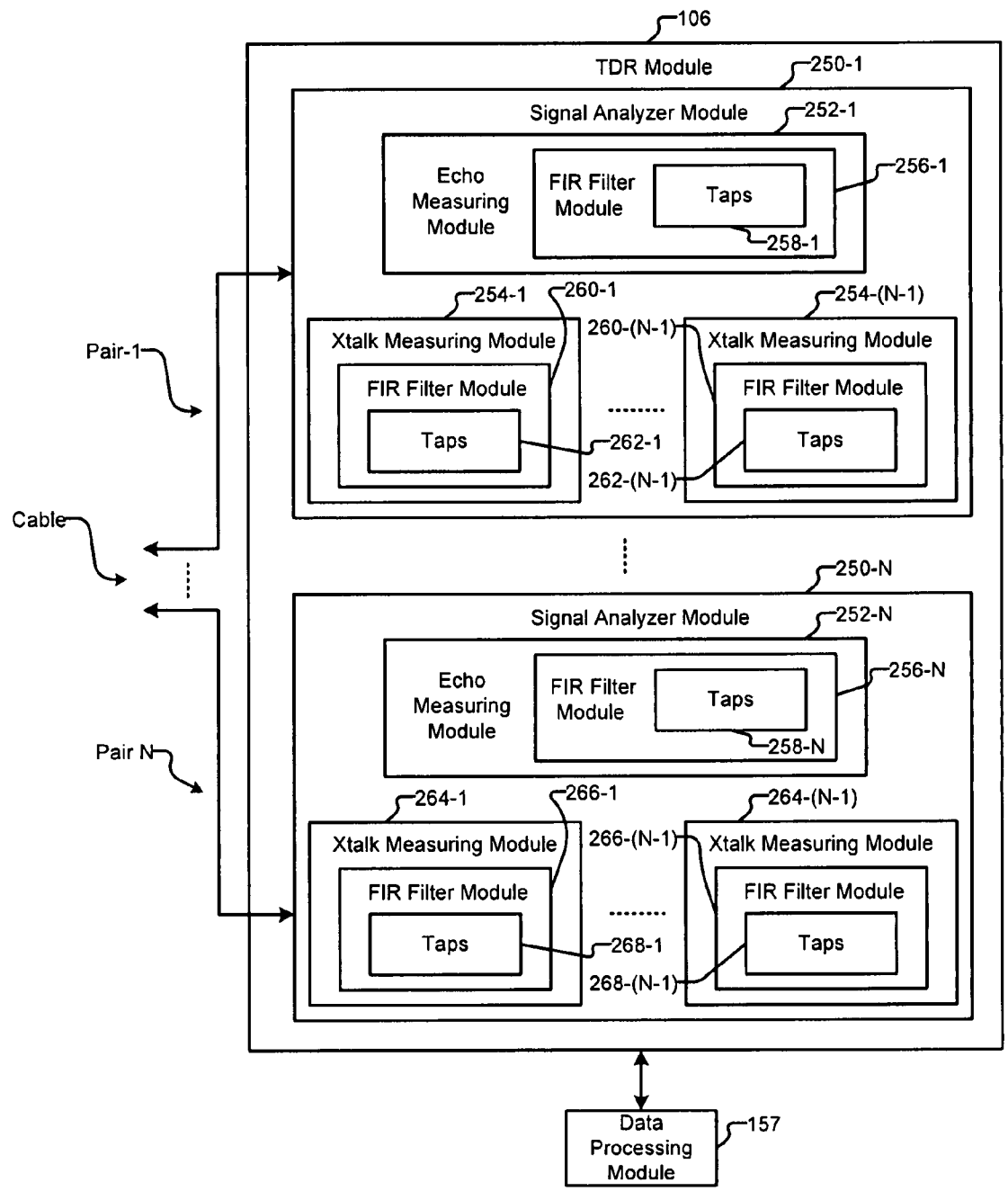
FIG. 8A is a functional block diagram of an exemplary time domain reflectometry (TDR) module that determines the type of a cable according to the present disclosure.
Figure 8B:
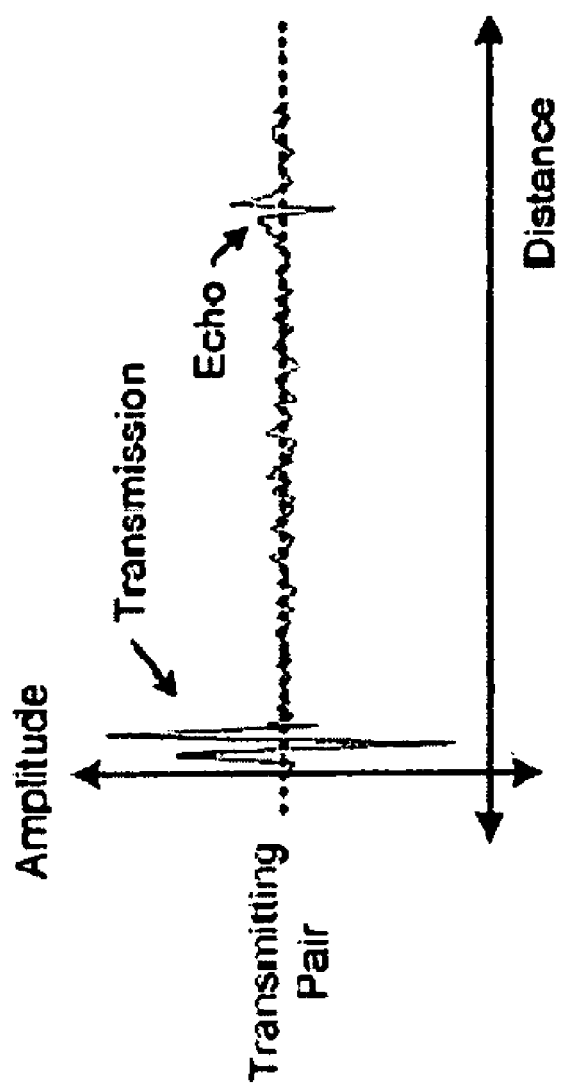
FIG. 8B is a graph of amplitude of an echo of a pulse transmitted through a pair of a cable as a function of a length of the cable according to the present disclosure.
Figure 8C:
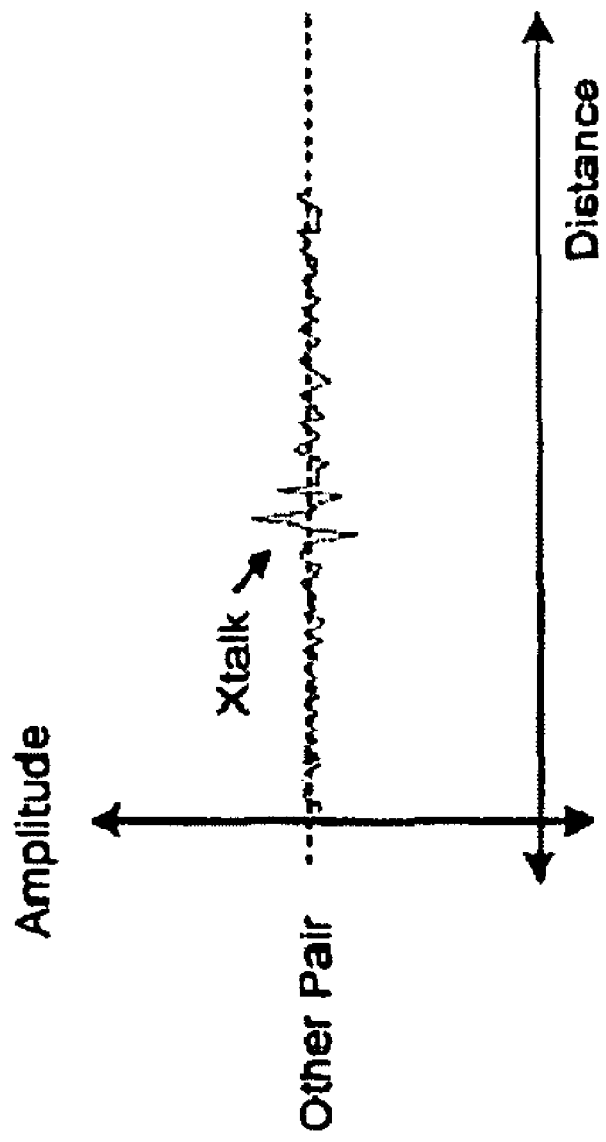
FIG. 8C is a graph of amplitude of crosstalk in a pair of a cable as a function of a length of the cable according to the present disclosure.

Referring now to FIGS. 8A-8C, the TDR module 106 of the PHY 154 may determine the type of the cable by transmitting a test waveform on a pair of conductors of the cable and by measuring the echo on that pair and the crosstalk between that pair and other pairs of the cable. Additionally, the PHY 154 may determine the impedance of the cable at different points of the cable by measuring the distances to the echo and/or crosstalk.

In FIG. 8A, the TDR module 106 may comprise signal analyzer modules 250-1, . . . , 250-N, where N is an integer greater than 1 and is equal to the number of pairs of conductors in the cable. The signal analyzer module 250-1 may comprise an echo measuring module 252-1 and crosstalk measuring modules 254-1, . . . , 254-(N−1) (collectively crosstalk measuring modules 254). The echo measuring module 252-1 may include a finite impulse response (FIR) filter module 256-1 having taps 258-1. The crosstalk measuring modules 254 may include FIR filter modules 260-1, . . . 260-(N−1) having taps 262-1, . . . , 262-(N−1) (collectively taps 262), respectively. The echo measuring module 252-1 measures an echo on the first pair of the cable by reading the taps 258-1. The crosstalk measuring modules 254 measure crosstalk between the first and second pairs and between the first and the $(N-1)^{th}$ pairs of the cable by reading the taps 262.

The signal analyzer module 250-N may comprise an echo measuring module 252-N and crosstalk measuring modules 264-1, . . . , 264-(N−1) (collectively crosstalk measuring modules 264). The echo measuring module 252-N may include a FIR filter module 256-N having taps 258-N. The crosstalk measuring modules 264 may include FIR filter modules 266-1, . . . 266-(N−1) having taps 268-1, . . . , 268-(N−1) (collectively taps 268), respectively. The echo measuring module 252-N measures an echo on the $N^{th}$ pair of the cable by reading the taps 258-N. The crosstalk measuring modules 264 measure crosstalk between the first and second pairs and between the $N^{th}$ and the $(N-1)^{th}$ pairs of the cable by reading the taps 268.

FIGS. 8B and 8C depict the echo and crosstalk, respectively. Based on the echo and crosstalk measurements, the data processing module 157 determines the type of the cable and the impedance of the cable at the distance of the echo and/or crosstalk. Based on the distance to the echo and/or crosstalk, the data processing module 157 determines the impedance of the cable at the distance of the echo and/or crosstalk.

Alternatively, the data processing module 157 can determine the impedance of the cable at various points of the cable based on filter coefficients of FIR filter modules. A frequency response of a FIR filter is a Fourier transform of filter coefficients. Filter coefficients are a set of constants also called tap weights. Accordingly, the data processing module 157 can determine filter coefficients by taking an Inverse Fourier transform of the filter response. Since the frequency response is based on the impedance of the cable at various points of the cable, the data processing module 157 can determine the impedance at various points of the cable based on the filter coefficients.

Figure 9A:
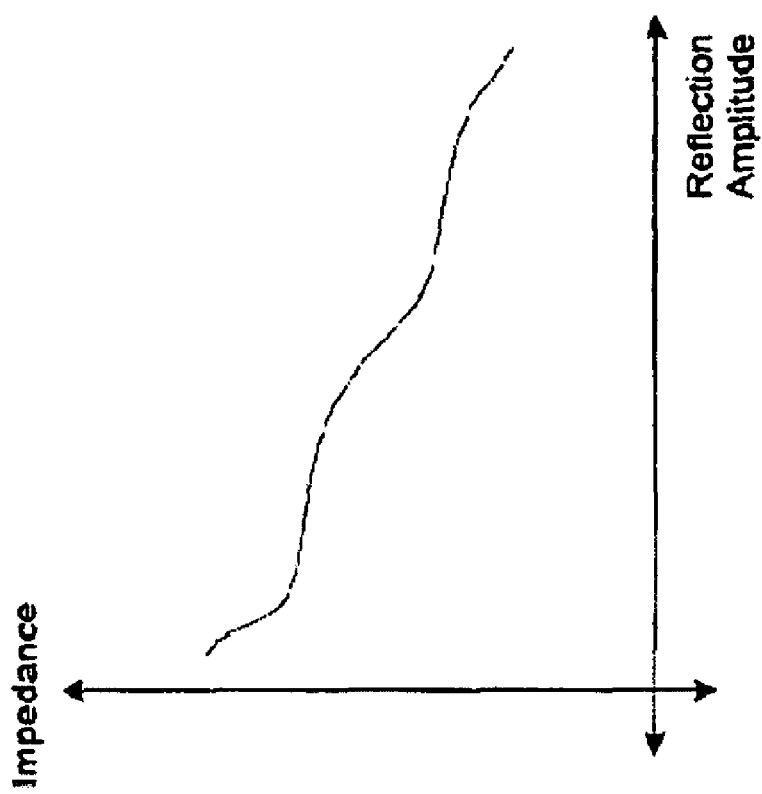
FIG. 9A is a graph of impedance of a cable as a function of amplitude of a return pulse received through the cable according to the present disclosure.

Referring now to FIG. 9A, a relationship between the impedance of the cable and the amplitude of the return pulse (also called reflection amplitude) is shown. Based on the relationship, the PHY 154 may determine the impedance of the cable at a distance from the PHY 154 as follows. The PHY 154 may store the relationship between the impedance of the cable and the amplitude of the return pulse in the processor memory 158 in the form of a lookup table. The lookup table may comprise impedances at various points of the cable and corresponding amplitudes of return pulses. The TDR module 106 may transmit a test signal on the cable and may measure the amplitude of the return pulse. The data processing module 157 may compare the amplitude of the return pulse with the amplitude-impedance relationship stored in the lookup table and determine the impedance of the cable.

Figure 9B:
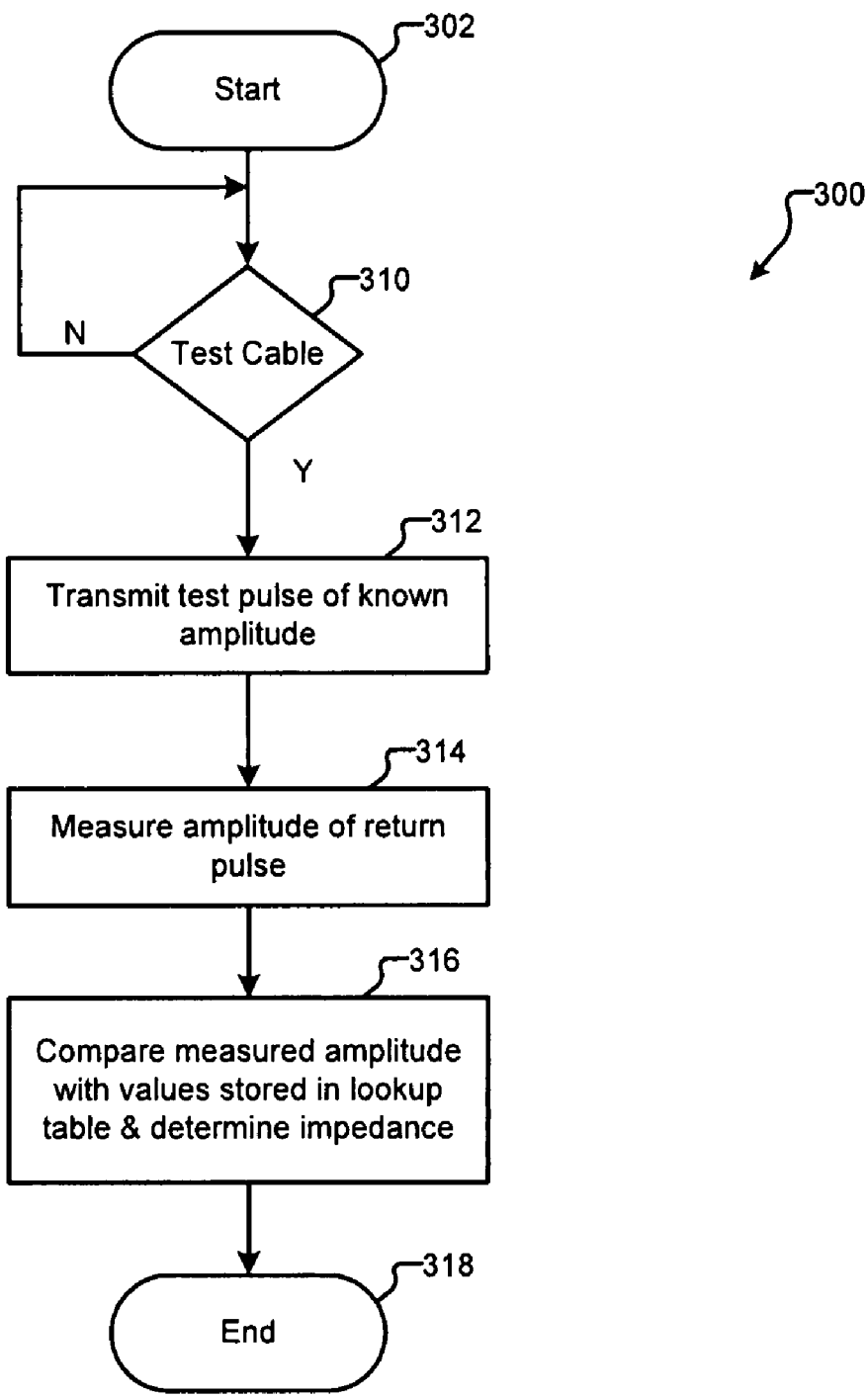
FIG. 9B is a flowchart of an exemplary method for determining impedance of a cable according to the present disclosure.

Referring now to FIG. 9B, a method 300 for determining the impedance of the cable begins at step 302. The PHY 154 determines whether to test the cable in step 310. If true, the TDR module 106 transmits a test pulse of a known amplitude through the cable in step 312. The data processing module 157 measures the amplitude of the return pulse in step 314. The data processing module 157 compares the measured amplitude to the amplitudes in a lookup table and determines the impedance of the cable in step 316. The method 300 ends in step 318.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A network interface, comprising:
a physical layer (PHY) device that includes:
a cable-test module that selectively tests a cable connected to said PHY device and that generates test data; and
a data processing module that includes a first processor that processes said test data and that generates test results indicating a status of said cable; and
a medium access controller (MAC) that communicates with said PHY device and that includes a second processor, wherein said PHY device selectively communicates said status to said second processor.

2. The network interface of claim 1 further comprising a management data input/output (MDIO) interface wherein said PHY device and said second processor communicate via said MDIO interface.

3. The network interface of claim 1 wherein said cable-test module tests said cable upon one of powering up and receiving a control signal from said second processor.

4. The network interface of claim 1 wherein said PHY device communicates said status to said second processor upon one of powering up and receiving a control signal from said second processor.

5. The network interface of claim 1 wherein said cable-test module further comprises:
first and second echo measuring modules that communicate with first and second pairs of said cable, that have finite impulse response (FIR) filters with first taps, and that measure echo on said first and second pairs, respectively; and
first and second crosstalk measuring modules that communicate with said first and second pairs, that have FIR filters with second taps, and that measure crosstalk on said first and second pairs, respectively,
wherein said data processing module determines at least one of a type of said cable, a distance to at least one of said echo and said crosstalk, and an impedance of said cable at said distance based on at least one of said first and second taps.

6. The network interface of claim 1 wherein said PHY device transmits a test signal on said cable and determines an impedance of said cable by comparing an amplitude of a return signal with an amplitude-impedance relationship stored in a lookup table in said PHY device.

7. The network interface of claim 1 wherein said cable-test module comprises a time domain reflectometry (TDR) module that transmits test signals on said cable, that receives return signals, and that generates said test data based on said test signals and said return signals.

8. The network interface of claim 1 wherein said PHY device transmits and receives signals comprising network data on said cable, and wherein said cable-test module comprises a digital signal processing (DSP) module that processes said signals and that generates said test data.

9. The network interface of claim 1 wherein:
said MAC receives a cable-test program that said first processor executes to test said cable from a remote device and said MAC communicates said cable-test program to said data processing module;
said data processing module stores said cable-test program; and
said first processor executes said cable-test program to test said cable.

10. The network interface of claim 1 wherein said status of said cable includes at least one of a length of said cable, an open circuit in said cable, a distance from said PHY device to said open circuit, a short-circuit in said cable, a distance from said PHY device to said short-circuit in said cable, an impedance at a predetermined length of said cable, and a type of said cable.

11. A method comprising:
integrating a cable-test module and a first processor in a physical layer (PHY) device;
selectively testing a cable connected to said PHY device;
generating test data using said cable-test module;
processing said test data using said first processor;
generating test results indicating a status of said cable; and
selectively communicating said status from said PHY device to a second processor of a medium access controller (MAC).

12. The method of claim 11 further comprising testing said cable upon one of powering up and receiving a control signal from said second processor.

13. The method of claim 11 further comprising communicating said status to said second processor upon one of powering up and receiving a control signal from said second processor.

14. The method of claim 11 further comprising:
communicating with first and second pairs of said cable via first and second echo measuring modules, respectively;
reading first taps of finite impulse response (FIR) filters of said first and second echo measuring modules;
measuring echo on said first and second pairs;

communicating with said first and second pairs of said cable via first and second crosstalk measuring modules, respectively;

reading second taps of FIR filters of said first and second crosstalk measuring modules;

measuring crosstalk on said first and second pairs; and determining at least one of a type of said cable, a distance to at least one of said echo and said crosstalk, and an impedance of said cable at said distance based on at least one of said first and second taps.

15. The method of claim 11 further comprising:

transmitting a test signal on said cable;

measuring an amplitude of a return signal; and determining an impedance of said cable based on said amplitude and an amplitude-impedance relationship stored in a lookup table.

16. The method of claim 11 further comprising transmitting test signals on said cable, receiving return signals, and generating said test data based on said test signals and said return signals using time domain reflectometry (TDR).

17. The method of claim 11 further comprising using digital signal processing (DSP) for processing signals comprising network data that said PHY device transmits and receives on said cable and generating said test data.

18. The method of claim 11 further comprising:

receiving a cable-test program that said first processor executes to test said cable from a remote device into said MAC;

communicating said cable-test program from said MAC to said PHY device;

storing said cable-test program in said PHY device; and executing said cable-test program to test said cable.

19. The method of claim 11 further comprises indicating said status of said cable that includes at least one of a length of said cable, an open circuit in said cable, a distance from said PHY device to said open circuit, a short-circuit in said cable, distance from said PHY device to said short-circuit in said cable, a type of said cable, and an impedance at a predetermined length of said cable.

20. A network interface, comprising:

physical layer (PHY) means for communicating with a cable, wherein said PHY means includes:

cable-test means for selectively testing said cable and generating test data; and data processing means for processing said test data, wherein said data processing means includes first processing means for processing said test data and generating test results indicating a status of said cable; and medium access controller (MAC) means for communicating with said PHY means, wherein said MAC means includes second processing means for selectively receiving said status from said PHY means.

21. The network interface of claim 20 further comprising management data input/output (MDIO) interface means for interfacing said PHY means to said second processing means.

22. The network interface of claim 20 wherein said cable-test means tests said cable upon one of powering up and receiving a control signal from said second processing means.

23. The network interface of claim 20 wherein said PHY means communicates said status to said second processing means upon one of powering up and receiving a control signal from said second processing means.

24. The network interface of claim 20 wherein said cable-test means further comprises:

first and second echo measuring means that have finite impulse response (FIR) filters with first taps for measuring echo on first and second pairs of said cable, respectively; and first and second crosstalk measuring means that have FIR filters with second taps for measuring crosstalk on said first and second pairs, respectively, wherein said data processing means determines at least one of a type of said cable, a distance to at least one of said echo and said crosstalk, and an impedance of said cable at said distance based on at least one of first and second taps.

25. The network interface of claim 20 wherein said PHY means transmits a test signal on said cable and determines an impedance of said cable by comparing an amplitude of a return signal with an amplitude-impedance relationship stored in a lookup table in said PHY means.

26. The network interface of claim 20 wherein said cable-test means comprises time domain reflectometry (TDR) means for transmitting test signals on said cable, receiving return signals, and generating said test data based on said test signals and said return signals.

27. The network interface of claim 20 wherein said PHY means transmits and receives signals comprising network data on said cable, and wherein said cable-test means comprises a digital signal processing (DSP) means for processing said signals and generating said test data.

28. The network interface of claim 20 wherein:

said MAC means receives a cable-test program that said first processing means executes to test said cable from a remote device and said MAC means communicates said cable-test program to said data processing means;

said data processing means stores said cable-test program; and said first processing means executes said cable-test program to test said cable.

29. The network interface of claim 20 wherein said status of said cable includes at least one of a length of said cable, an open circuit in said cable, a distance from said PHY means to said open circuit, a short-circuit in said cable, a distance from said PHY means to said short-circuit in said cable, a type of said cable, and an impedance at a predetermined length of said cable.

* * * * *